United States Patent
Sayers et al.

(10) Patent No.: US 11,710,327 B2
(45) Date of Patent: Jul. 25, 2023

(54) IDENTIFICATION OF 3D PRINTED OBJECTS

(71) Applicant: Hewlett-Packard Development Company, L.P., Spring, TX (US)

(72) Inventors: Craig Peter Sayers, Palo Alto, CA (US); Patrick Daney De Marcillac, Grenoble (FR); Wei Huang, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 323 days.

(21) Appl. No.: 17/108,819

(22) Filed: Dec. 1, 2020

(65) Prior Publication Data
US 2021/0224535 A1    Jul. 22, 2021

(30) Foreign Application Priority Data
Jan. 17, 2020   (EP) ..................... 20290007

(51) Int. Cl.
| G06T 7/55 | (2017.01) |
| G06V 20/80 | (2022.01) |
| B29C 64/386 | (2017.01) |
| G06T 7/60 | (2017.01) |
| B33Y 50/02 | (2015.01) |

(52) U.S. Cl.
CPC ............ G06V 20/80 (2022.01); B29C 64/386 (2017.08); G06T 7/55 (2017.01); G06T 7/60 (2013.01); B33Y 50/02 (2014.12)

(58) Field of Classification Search
CPC ... B29C 64/135; B29C 64/209; B29C 64/245; G05B 15/02; H04L 9/3247; H04L 2209/72; B33Y 50/02; B33Y 80/00
See application file for complete search history.

(56) References Cited

U.S. PATENT DOCUMENTS

| 8,630,481 B2 | 1/2014 | Kane |
| 9,208,394 B2 | 12/2015 | Di Venuto Dayer |
| 9,566,743 B2 | 2/2017 | Kozlak |
| 9,569,650 B2 | 2/2017 | Hanina |
| 10,059,053 B2 | 8/2018 | Jaker |
| 2016/0259306 A1* | 9/2016 | Pangrazio, III ....... H04L 9/3247 |
| 2016/0337549 A1 | 11/2016 | Nuuja |
| 2016/0375676 A1 | 12/2016 | Ritchie |
| 2019/0034694 A1 | 1/2019 | Ross |
| 2022/0219388 A1* | 7/2022 | Kirchner ............... B29C 64/245 |

FOREIGN PATENT DOCUMENTS

| WO | WO-2018140004 A1 | 8/2018 |
| WO | WO-2019161445 A1 | 8/2019 |

* cited by examiner

*Primary Examiner* — Phuoc H Doan
(74) *Attorney, Agent, or Firm* — Shook, Hardy & Bacon L.L.P.

(57) ABSTRACT

In example implementations, a method is provided. The method includes printing a three-dimensional (3D) object that includes a secondary structure. The secondary structure is removed. A representation of a surface of the 3D object where the secondary structure was removed is captured. The 3D object is authenticated based on the representation of the surface.

9 Claims, 5 Drawing Sheets

126

IDENTIFICATION OF 3D PRINTED OBJECTS

BACKGROUND

Three dimensional (3D) printers can be used to manufacture various objects. 3D printers can use additive manufacturing or subtractive manufacturing to print the object. For example, a computer rendered drawing of an object may be created and loaded into the 3D printer. A print material or powder may then be added onto a movable platform of the 3D printer. Each layer of the object may be printed on the material or powder. For example, a binder may be printed onto the powder and heated. Energy may be applied to the layer to fuse the powder with the binder and another layer of the material may be added. The process may be repeated layer-by-layer until the entire object is printed.

DETAILED DESCRIPTION

Examples described herein provide a method and apparatus for authenticating identifying 3D printed objects based on surfaces created by removal of secondary structures. As noted above, objects can be printed using 3D printers. In some instances, it may be desirable to track or authenticate the parts that are printed. For example, the parts can be tracked for quality control, legal enforcement, or to identify a 3D printer that may be malfunctioning, and the like. Parts can be authenticated to validate identity, to detect counterfeits, for non-repudiation so an organization cannot later deny having produced a part, and the like.

The present disclosure uses a unique surface created by removal of a secondary structure to authenticate the object. In some examples, the unique surface created by removal of the secondary structure may also be used to authenticate or identify a particular object from among the printed objects. In one example, secondary structures may be connected to and printed with the 3D object. The secondary structures may be temporary and used to perform a step in processing the 3D object and removed after that step is complete. For example, the secondary structures may be a removable identification tag used to track a part during processing, a frame to hold a part during post-processing, or a support structure to prevent a part from deforming during printing. For example, some 3D printing processes may print multiple objects. The removal of the secondary structure may be used to authenticate at least one of the objects from the batch of objects that are printed. As a result, the present disclosure may provide a more efficient method for authenticating or identifying an object after being detached.

For example, when a secondary structure of the object is removed, the removal may create a unique surface profile where the secondary structure was removed. Notably, no two breaks are identical. In one example, an image of the surface or a measurement of the topology of the surface may be captured and stored. At a later time, an image or a measurement of the topology of the surface may be obtained and compared to the image or measurements that were previously stored to identify or authenticate the object.

In some examples, the secondary structure may be removed after post-processing of the 3D object. For example, post-processing may remove certain features of the 3D object and then the secondary structure may be removed to create the unique surface.

In some examples, the secondary structure that is removed may include a label with identification information. The secondary structure can be used to also identify the object. For example, the side of the secondary structure that was removed from the object can be matched against the corresponding surface on the object. Then the identification information on the secondary structure can be used to identify the object.

Figure 1:
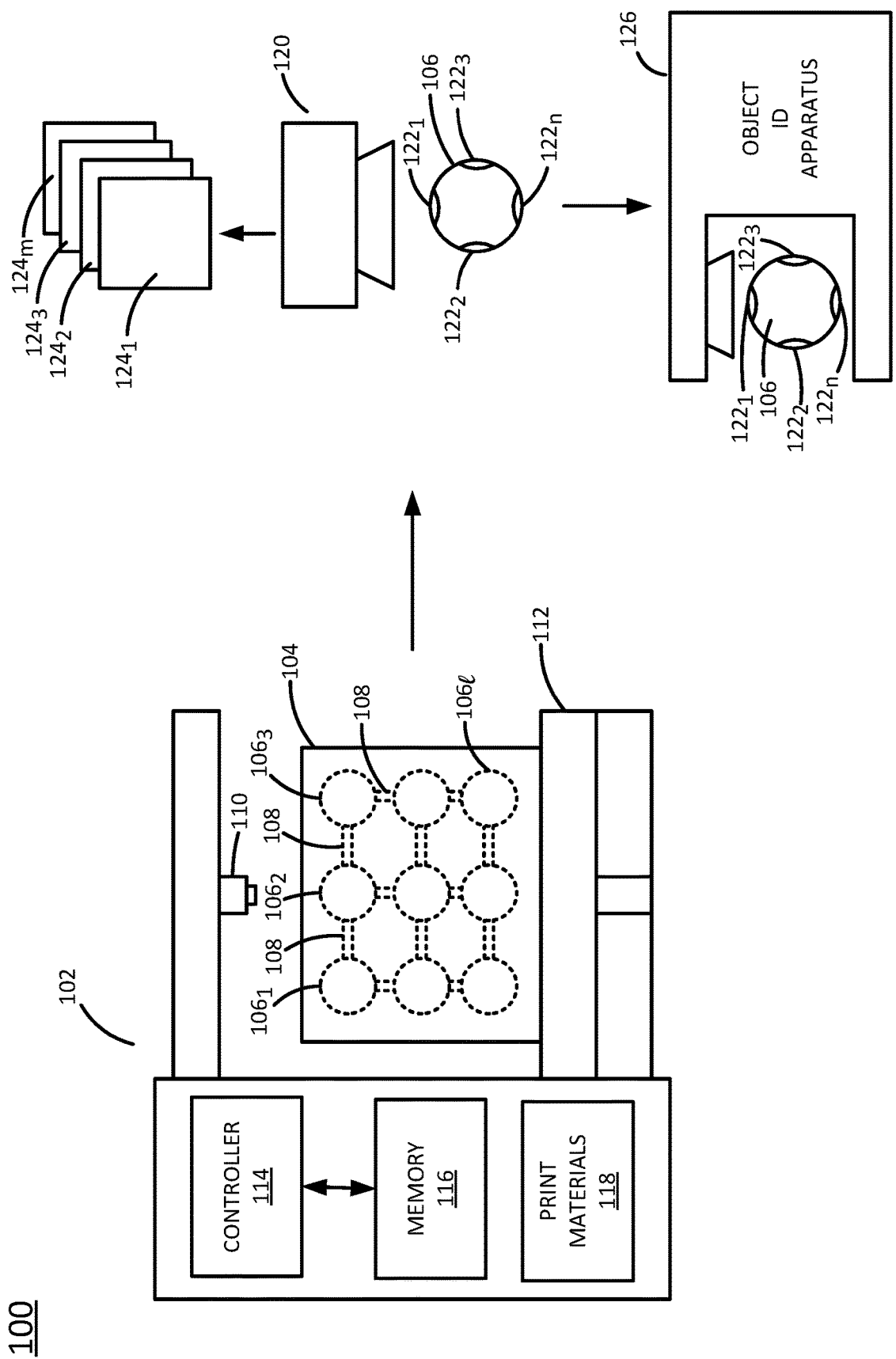
FIG. 1 is a block diagram of an example 3D printer with a printed object, a camera and an apparatus to identify the printed object of the present disclosure.

FIG. 1 illustrates an example block diagram of an example system 100 to print a 3D printed objects $106_1$ to $106_j$ (also referred to individually as the object 106 or collectively as objects 106) and identify the objects 106 of the present disclosure. The objects 106 may be the same type of object or may be different types of objects that are 3D printed. In one example, the system 100 may include a 3D printer 102. The 3D printer may be any type of additive manufacturing printer. For example, the 3D printer may be a filament-based 3D printer, a selective laser sinter (SLS) 3D printer, a fused deposition modeling (FDM) 3D printer, stereolithography (SLA) 3D printer, a multi-jet fusion printer, a metal jet fusion printer, and the like.

In an example, the 3D printer 102 may be communicatively coupled to an endpoint device (not shown). A design for the objects 106 may be created on the endpoint device and transmitted to the 3D printer 102. For example, the design may be stored in a memory 116 of the 3D printer 102. A controller 114 may control operation of a printhead 110 and dispensing of print materials 118 to print the objects 106 in accordance with the design.

For example, the objects 106 may be printed layer by layer on a movable platform 112. A layer of the print material 118 may be dispensed onto the movable platform 112. The design may be "printed" onto the layer via the printhead 110. The printhead 110 may perform "printing" in a variety of different ways based on a type of 3D printer that is used. The process may be repeated until the object 106 is printed.

In an example, the objects 106 may be printed with fine powders that are formed as a block 104. The objects 106 may be formed within the block 104 as shown by dashed lines in FIG. 1. Although the objects 106 are illustrated as simple spheres, it should be noted that the objects 106 can be more complex and of a different shape. For example, the objects 106 can be a cup, parts for a machine, figurines, or any other type of structure.

In one example, the objects 106 can be printed with secondary structures $108_1$ to $108_n$ (hereinafter also referred to individually as a secondary structure 108 or collectively as secondary structures 108). In some examples, the secondary structure 108 may be a sprue that is used to connect the objects 106 within the block 104. After the objects 106 are printed, the block 104 may be "de-caked" to remove the un-fused portions of the powder and reveal the printed objects 106. During the de-caking processing step, the sprue holds the parts together, so no smaller parts are lost. After the de-caking is complete, the sprues may be removed.

In other examples, the secondary structure may be support structures. For example, in some 3D printing methods the additive printing may be printed layer-by-layer. For example, the object 106 may be a sphere and a frame with support structures may support the object 106 as the object 106 is printed. The support structures may be the secondary structure 108. In other examples, the secondary structures 108 may be a printed tag that can be removed, or any additional structure that is part of a processing step that can be later removed.

Some objects 106 may have originally been designed to be printed without support structures or the frame 104. As a result, the secondary structure 108 may be an additional removable structure that is added to the object 106 during the printing process.

In an example, the secondary structures 108 may be printed so that they can be removed or broken off without damaging the object 106. For example, the secondary structures 108 may be printed on a millimeter scale. In addition, the secondary structures 108 may be printed to include geometries or features to allow for easy removal. For example, the secondary structures 108 may be printed with a neck portion that can be easily be broken. In one example, the locations where the secondary structures 108 are connected may be partially fused to allow the secondary structures 108 to be easily broken off of, or removed from, the object 106.

When the secondary structures 108 are removed, the removal of the secondary structures 108 may create respective surfaces $122_1$ to $122_n$ (hereinafter also referred to individually as a surface 122 or collectively as surfaces 122). Although multiple secondary structures 108 and surfaces 122 are illustrated in FIG. 1, it should be noted that a single secondary structure 108 may be printed to create a single corresponding surface 122.

In an example, the surfaces 122 may possess a unique surface pattern. In other words, no two breaks may create an identical pattern on the respective surfaces 122 when a secondary structure 108 is removed from the object 106. Said another way, the surface 122 may include random variations that are unique to a particular break when the secondary structure 108 is removed that is different from all other surfaces 122 of other objects 106. In other words, the grains or voxels and how they are broken on the surfaces 122 may be different for each one of the surfaces 122.

In some examples, the surfaces 122 may be printed with different colors. The different colors may be applied down to a voxel level. In other words, some voxels in the area of the surfaces 122 may be printed with a different color. In some examples, some of the voxels in the surfaces 122 may be printed with a different material that can appear as a different color when different non-visible wavelengths are applied to the voxels. In other examples, the voxels in the area of the surfaces 122 may be fused differently to create different or unique patterns. In some examples, the voxels constituting the linkage between the two structures may be engineered and printed with different characteristics (e.g., under-fused) such that weak points may be introduced and the breakage may form a 3D recognizable pattern (e.g., an embossed, debossed, or black and white) to create a quick response (QR) code, 3D data matrices, or any other symbolic machine readable code when viewed at a macro level, when the secondary structure 108 is broken off of the object 106.

In one example, the secondary structure 108 may be printed with identification information. For example, the secondary structure 108 may include information related to a location within the volume of the block 104 that was printed, a batch number, a date and time that the object 106 was printed, an ID of a particular 3D printer 102 that was used to print the object 106, or any other information related to the object 106 or printing of the object 106.

The secondary structure 108 may be removed and kept to also identify the corresponding object 106. For example, the object 106 may have no identification marks other than a surface 122 that is created when the secondary structure 108 is removed. The secondary structure 108 may be matched to the object 106 based on a match of the surface 122 and a surface of the secondary structure 108 that was broken off of the object 106. Then, the object 106 can be identified from the identification information contained on the secondary structure 108.

In another example, the objects 106 can be removed from the secondary structure 108 accidently before registering the surface 122 of the object 106 with the corresponding secondary structure 108. However, the surfaces 122 of the object 106 can be used to find the matching secondary structure 108. Then, the identification information on the secondary structure 108 can be used to identify the object 106 and register the secondary structure 108 to the object 106 for later identification or authentication, as discussed in further details below.

As a result, the surfaces 122 and/or a label printed on the secondary structure 108 and/or an identifying mark printed on the object 106 and/or the shape of the object 106 may be used to identify the object 106. For example, a plurality of objects 106 may be printed. Each one of the objects 106 may be identified, tracked, and/or authenticated based on a surface 122 that is created from removing a secondary structure 108 from the objects 106 and/or the secondary structure 108.

In an example, the system 100 may also include an initial optical device 120. The initial optical device 120 may be used to scan the surfaces 122 of each object 106. The initial optical device 120 may capture the scans and store the scans as representations $124_1$ to $124_m$ (hereinafter also referred to individually as a representation 124 or collectively as representations 124). The representations 124 may each be labeled with the respective object 106, which was thus far possibly identified via a printed label on the corresponding secondary structure 108.

The scan may capture an image or measure three-dimensional (3D) features on the surface 122. The representations 124 may be two-dimensional (2D) images, 3D images, or a combination of both. In other words, for each object 106, 2D representations may be captured, 3D representations may be captured, or both 2D and 3D representations may be captured.

In an example, a 2D representation may be a photograph or video image. The photograph may be in black and white or in color. In one example, the surface 122 may be designed with a pattern of colors to improve identification, as discussed in further details below and illustrated in FIG. 2.

In an example, a 3D representation may be a topography image or measurements of geometric features on the surface 122. For example, when the secondary structure 108 is broken off, the break may create an uneven surface 122 with a variety of peaks and valleys, contours, and the like. The 3D representation may be an image of the shape and/or contours of the geometric features of the surface 122.

In an example, the system 100 may also include an object identification (ID) apparatus 126. The object ID apparatus 126 may be used to identify the object 106 based on an analysis of the surfaces 122 of the objet 106. The object ID apparatus 126 may capture a representation of the surfaces 122 and then compare the captured representations with the previously captured representations 124. If a match is found, the object 106 may be identified.

In one example, the object ID apparatus 126 may scan each surface $122_1$ to $122_n$ and try to match each captured representation of the surfaces $122_1$ to $122_n$ with one of the representations $124_1$ to $124_m$. In one example, the object ID apparatus 126 may scan a single one of the surfaces $122_1$ to $122_n$ or a subset of the surfaces $122_1$ to $122_n$.

Thus, the unique features of surfaces 122 created on an object 106 from breaking off a secondary structure 108 may be used to identify the object 106. The surfaces 122 can be created with no additional costs as the secondary structures 108 may be part of the design to print the object 106.

Figure 2:
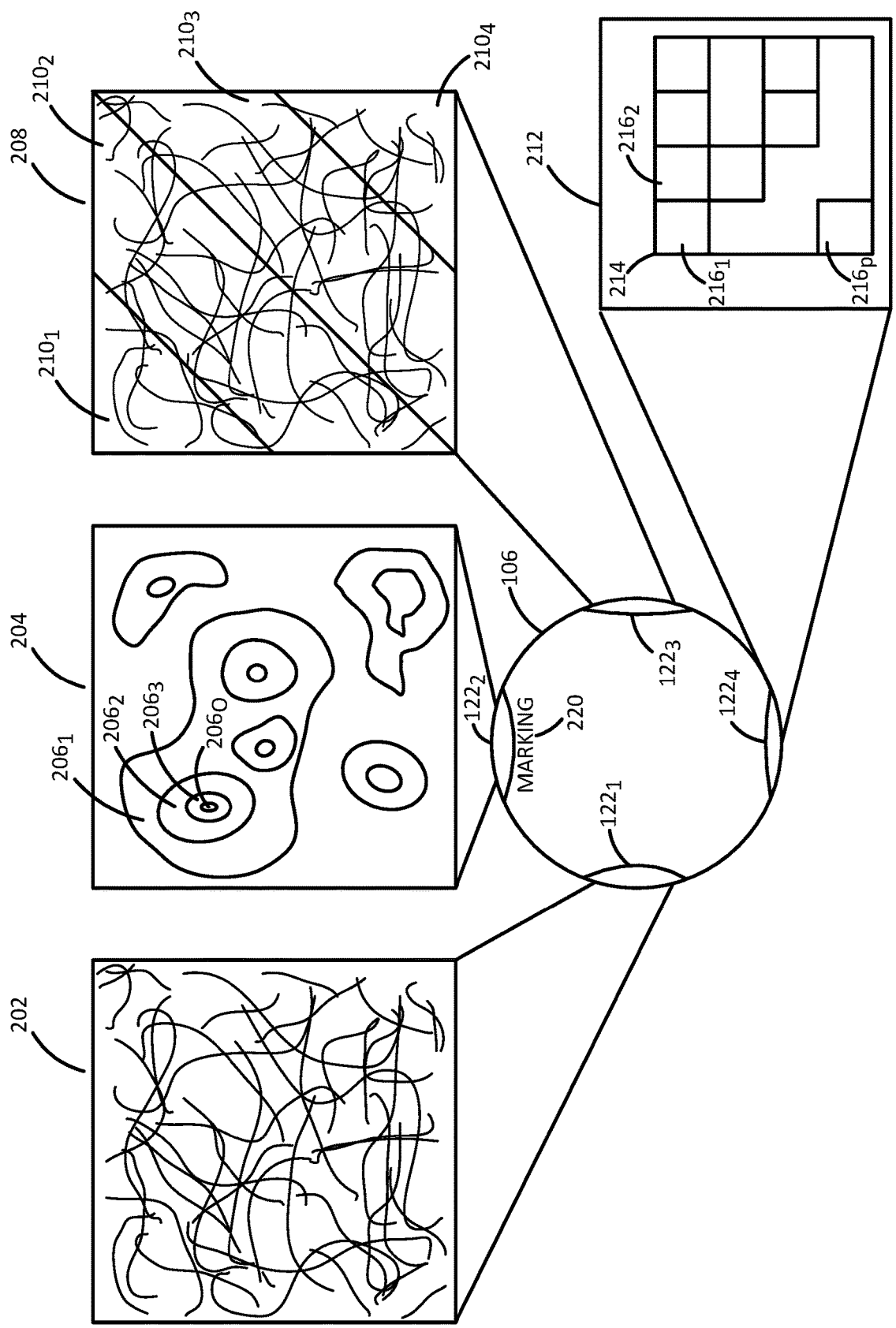
FIG. 2 is a block diagram of an example surface created on the object by removal of a secondary structure of the present disclosure.

FIG. 2 illustrates some examples of the surfaces 122. The different patterns of the surfaces $122_1$, $122_2$, $122_3$ and $122_4$ may be captured by respective representations 202, 204, and 206. Although FIG. 2 illustrates an object 106 with three different patterns formed on respective surfaces $122_1$, $122_2$, $122_3$ and $122_4$, it should be noted that the surfaces 122 may all have the same pattern.

In one example, the surface $122_1$ may be captured as a two-dimensional representation 202. The two-dimensional representation 202 may be a photograph or video image that shows a unique pattern of the broken voxels of the surface $122_1$. In one example, the two-dimensional representation 202 may be a black and white photograph or a color photograph.

In one example, the surface $122_2$ may be captured as a three-dimensional representation 204. The three-dimensional representation 204 may include various regions $206_1$ to $206_o$ (hereinafter also referred to individually as a region 206 or collectively as regions 206). Each region 206 may represent a different elevation. For example, the region $206_1$ may represent a first elevation, the region $206_2$ may represent a second elevation, the region $206_3$ may represent a third elevation, and so forth. In another example, the three-dimensional representation may be an actual three-dimensional representation. In other words, the representation 206 may be a digital image that can be rotated and moved to show the actual contours of the surface $122_2$.

In one example, the surface $122_3$ may be captured as a two-dimensional representation 208. However, the surface $122_3$ may be designed to include different regions of color when printed on the 3D printer 102. For example, a first region $210_1$ may be a first color, the region $210_2$ may be a second color, the region $210_3$ may be a third color, and the region $210_4$ may be a fourth color. In another example, the regions $210_1$ and $210_3$ may be a first color and the regions $210_2$ and $210_4$ may be a second color to create an alternating pattern of colors. Other patterns of color may also be used that are within the scope of the present disclosure. Also, although the regions $210_1$ to $210_4$ are illustrates as diagonal stripes, it should be noted that the regions $210_1$ to $210_4$ may be printed as different colored voxels, in different shapes, in different shapes and sizes, and the like. The different colored regions $210_1$ to $210_4$ may provide an additional feature that can be used to identify the object 106 in addition to the unique pattern on the surface 208 created from the removal of the secondary structures 108.

In one example, the surface $122_4$ may be captured as two-dimensional representation 212. The two-dimensional representation 212 may include voxels $216_1$ to $216_p$ (hereinafter also referred to individually as a voxel 216 or collectively as voxels 216) that are printed to appear as a machine-readable code 214 when viewed at a macro level. For example, as noted above, when the object 106 is printed, the way the voxels 216 are printed within the surface 122 may be controlled. For example, the voxels 216 may be fused differently, different colors may be used for different voxels 216, and the like. Thus, the voxels 216 may be printed such that when the secondary structure 108 is broken off, the voxels 216 in the surface $122_4$ may appear as a machine-readable code 214 (e.g., a QR code, a barcode, and the like).

In one example, techniques used herein may be combined. Specifically, techniques for micro details identifications as in 202, 204, 208 may be combined with 212 that may be used for macro identification. The latter being easier to capture to guide the downstream processing of the object while the former may be harder to read and used only when full identification or authentication may be needed.

In one example, the surfaces 122 may include a marking 220 located near, around, or below (e.g., via ultraviolet reactive voxels) the surfaces 122. For example, the marking 220 may be printed during the printing of the object 106. The marking 220 may help to identify a location of the surface 122. As noted, the surfaces 122 may be relatively small compared to the overall size of the object 106. As a result, the marking 220 may help to identify where the surfaces 122 are located. The marking 220 may also be used by the object ID apparatus 126 to align a surface 122 with an optical device of the object ID apparatus 126.

In some examples, the marking 220 may include additional information that can be used to identify the 3D object. In some examples, the marking 220 may include identification of the 3D object that can be matched against identification information associated with a previously captured representation 124 that matches a representation of the surface 122 that is captured for identification.

Figure 3:
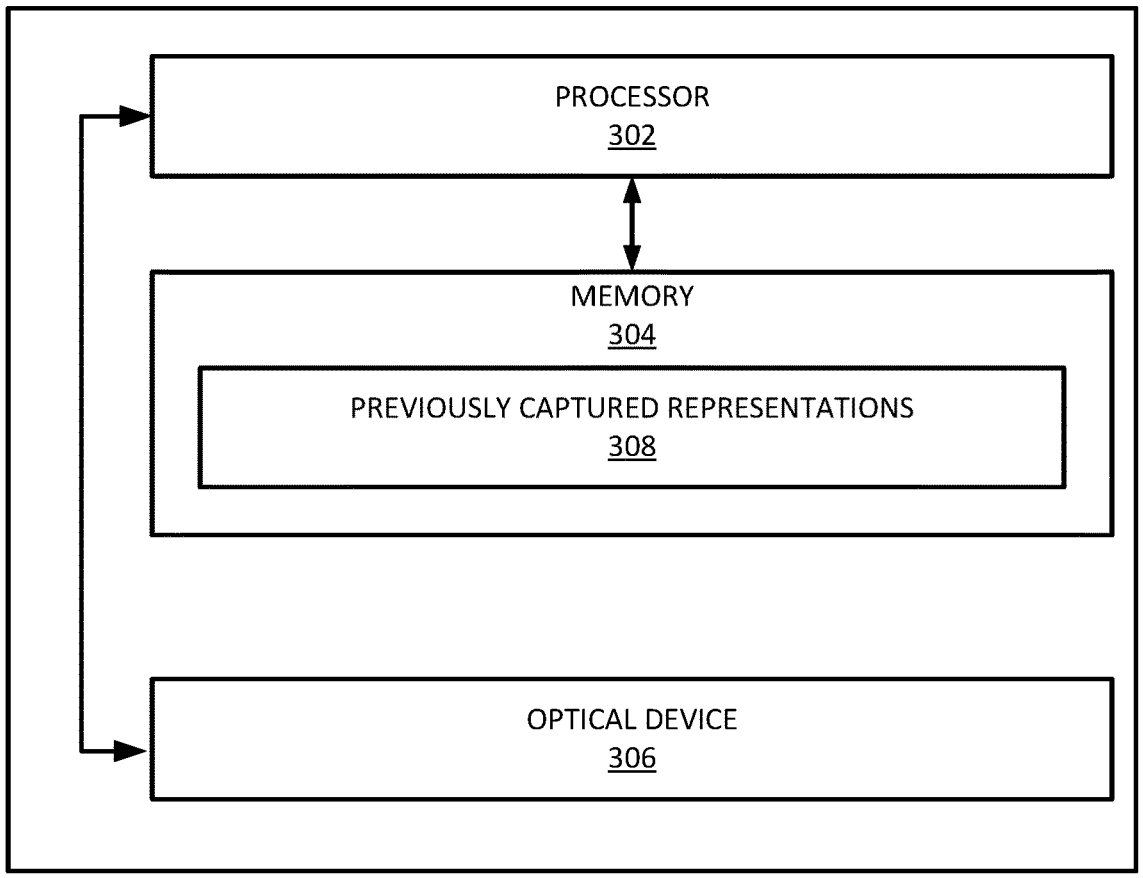
FIG. 3 is a more detailed block diagram of an example apparatus to identify the object based on the surface created by removal of a secondary structure of the present disclosure.

FIG. 3 illustrates a block diagram of the object ID apparatus 126 of the present disclosure. In one example, the object ID apparatus 126 may include a processor 302, a memory 304, and an optical device 306. The processor 302 may be communicatively coupled to the memory 304 and the optical device 306. The processor 302 may execute instructions stored in the memory 304 and control operation of the optical device 306.

In one example, the memory 304 may be a non-transitory computer readable medium. The memory 304 may be a hard disk drive, a solid-state drive, a read only memory, a random access memory, and the like. In one example, the memory 304 may include previously captured representations 308. For example, the previously captured representations 308 may include the representations 124 that were captured by the initial optical device 120. The previously captured representations 308 may be photographs, three dimensional representations, and the like, similar to the representations 124 described above in FIG. 1.

In one example, the optical device 306 may scan the surfaces 122 of the object 106. For example, the optical device 306 may be a camera, a video camera, a 3D scanner, a depth sensing camera, and the like. The optical device 306 may capture two dimensional or three-dimensional representations of the surfaces 122 on the object 106. X-ray may also be used.

In one example, the object 106 may be placed within view of the optical device 306. The object 106 may be positioned such that a surface 122 of the object 106 can be captured by the optical device 306. For example, the object 106 may be moved until the marking 220 is detected by the optical device 306. The optical device 306 may capture a representation of the surface 122. In one example, the processor 302 may then compare the captured representation to the previously captured representations 308. A match may be found and the previously captured representation 308 that matches the currently captured representation of the surface 122 may be used to identify the object 106.

Although the initial optical device 120 is shown in FIG. 1 as a separate device from the object ID apparatus 126, in one example, the initial optical device 120 may be the optical device 306. In other words, the object ID apparatus 126 may capture the initial representations 124 that identify an object, stored them as the previously captured representations 308 in the memory 304, and then perform the identification by capturing subsequent representations of the surfaces 122 of the object 106.

Figure 4:
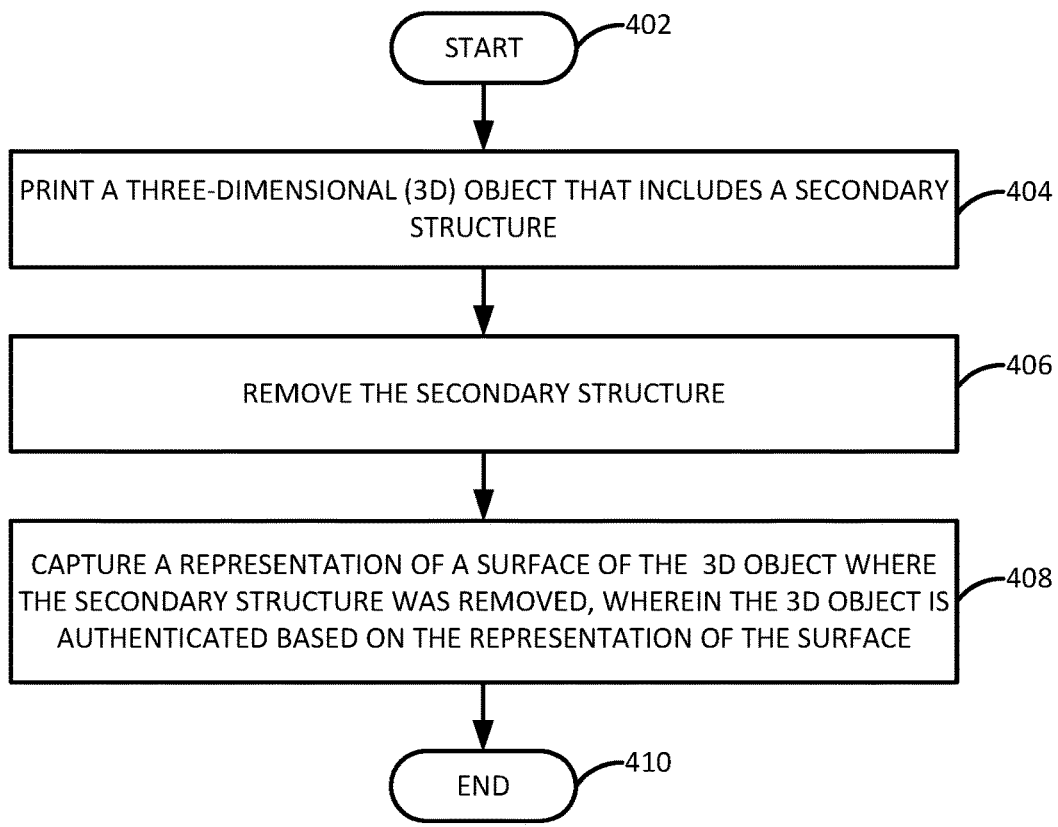
FIG. 4 a flow chart of an example method for identifying an object based on a surface created from removal of a secondary structure from the object of the present disclosure.

FIG. 4 illustrates a flow diagram of an example method 400 for identifying an object based on a surface created from removal of a secondary structure from the object of the present disclosure. In an example, the method 400 may be performed by the apparatus 300 or the apparatus 500 illustrated in FIG. 5, and described below.

At block 402, the method 400 begins. At block 404, the method 400 prints a three-dimensional (3D) object that includes a secondary structure. For example, the 3D object may be designed to include secondary structures that can be removed. The secondary structures may be printed with features that allows for easy removal of the secondary structure without damaging the 3D object.

For example, the secondary structure may be used for processing the 3D object. The secondary structure may prevent the part from deforming during the printing process, provide a handle to hold the part during post-processing, provide a label to identify the part during production, and the like.

In an example, the secondary structures may include a sprue that is part of a frame. For example, some 3D objects may have curved surfaces that use a frame to prevent the 3D object from moving during printing. The secondary structure may include support structures, printed label or printed label tag that can be removed, or any other secondary structure that can be removed.

At block 406, the method 400 removes the secondary structure. For example, after the secondary structure is no longer used for processing of the 3D object the secondary structures can be removed. For example, the secondary structure may be broken from the surface of the 3D object. When the secondary structure is broken off, a unique surface may be created in the area that of the 3D object that was connected to the secondary structure. As noted above, no two breaks create the same pattern on the surface of the 3D object. As a result, the pattern created on the surface of the 3D object from breaking off the secondary structure can be used to identify or authenticate the 3D object. Identification of the 3D object can be used for tracking, quality control, and the like. Authentication of the 3D object can be used to verify the identity, to detect counterfeit parts, and the like.

In an example, the pattern may include different colors. For example, the area of the 3D object connected to the secondary structure may be printed with different colors, different colored regions, different colored shapes, different colored patterns, and the like, to create a unique pattern. In an example, different colors may be used down to a voxel level to create a unique pattern when the secondary structure is removed.

In an example, the secondary structure may include a printed label that includes identification information of the 3D object. The 3D object may be associated with the secondary structure. The secondary structure can then be used to also perform identification at a later time. For example, the surface of the secondary structure created, and the surface of the 3D object can be matched. The identification information on the secondary structure can then be used to identify and/or track the 3D object at a later time.

At block 408, the method 400 captures a representation of a surface of the 3D object where the secondary structure was removed, wherein the 3D object is authenticated based on the representation of the surface. The representation may be a 2D representation or a 3D representation. Examples of 2D representations may be a photograph or video image. Examples of a 3D representation may include an image that shows different topographies or contours of the surface of the 3D object where the secondary structure is removed. Other examples of 3D representations may include a digital image shows the actual height, geometries, contours, and the like of the surface. For example, the digital image can be rotated and moved to see the surface of the 3D object.

In one example, the representation may be captured by an optical device that scans the surface. As described above, the optical device may be a camera, a 3D scanner, a depth sensing camera, and the like.

In an example, the representation may be used to identify the 3D object. For example, the representation may be associated with a particular 3D object and stored in memory. At a later time, the surface or surfaces where the secondary structure is removed on the 3D object may be scanned to capture a representation. The recently captured representation may be compared to the stored representations that were previously captured. A match may be found to identify the 3D object at a later time.

In an example, authentication may include a comparison of the representation to a previously captured representation of the surface of the 3D object where the secondary structure was removed. For example, if the 3D object may be known then the previously captured representation may be retrieved and compared to the currently captured representation to authenticate the 3D object.

In an example, authentication may include identification of the 3D object. For example, if the 3D object is not known, then the representation may be compared to a plurality of previously captured representations to identify the previously captured representation that matches the representation that was recently captured.

In an example, the representation may also include a corresponding surface of the secondary structure that was broken off. As noted above, the secondary structure may be matched to the 3D object based on the corresponding surfaces. The information on the secondary structure that was kept may then be used to identify the 3D object or obtain additional information related to the 3D object (e.g., location within a block when printed, which 3D printer was used to print the 3D object, and so forth).

In one example, the representation on the surface of the 3D object may include voxels that are arranged to appear as a QR code, 3D data matrices, or other type of encoding at a macro level. That representation on the surface of the 3D object can provide at least partial identification. The corresponding secondary structure may provide the additional identification of the 3D object (e.g., via its label).

In one example, the micro level details of the surface and the macro level of details of the surface may be used in combination. For example, the micro level details may include the unique features of how each voxel is torn when the secondary structure is removed. The macro level details may include how a group of voxels appear (e.g., a pattern of colors or arrangement of the voxels within a group of voxels). The micro level details may be used to identify the object via the representations, as described above. The macro level details (e.g., the voxels that appear as a QR code) can provide other information, such as where the break occurred. In another example, the macro level details may provide an ID that is unique to a local workflow and the micro level details may have more fine details that provide for a global unique ID. At block 410, the method 400 ends.

Figure 5:
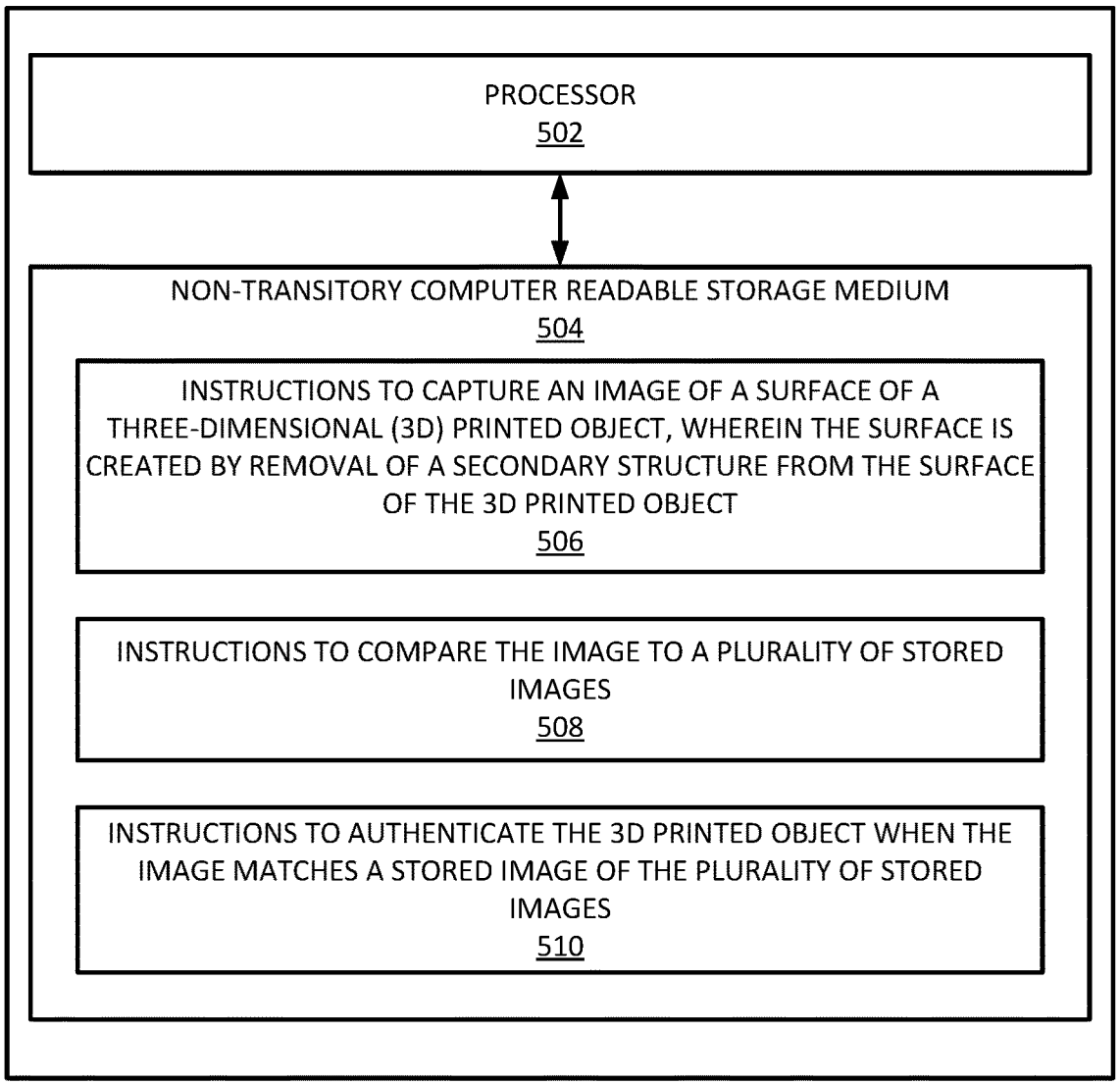
FIG. 5 is a block diagram of an example non-transitory computer readable storage medium storing instructions executed by a processor to identify a part based on a surface created from removal of a secondary structure from the object.

FIG. 5 illustrates an example of an apparatus 500. In an example, the apparatus 500 may be the 3D printer 102. In an example, the apparatus 500 may include a processor 502 and a non-transitory computer readable storage medium 504. The non-transitory computer readable storage medium 504 may include instructions 506, 508, and 510 that, when executed by the processor 502, cause the processor 502 to perform various functions.

In an example, the instructions 506 may include instructions to capture an image of a surface of a three-dimensional (3D) printed object, wherein the surface is created by removal of a secondary structure from the surface of the 3D printed object. The instructions 508 may include instructions to compare the image to a plurality of stored images. The instructions 510 may include instructions to authenticate the 3D printed object when the image matches a stored image of the plurality of stored images.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

The invention claimed is:

1. A method, comprising:
    printing a three-dimensional (3D) object that includes a secondary structure wherein the secondary structure comprises a portion of a support structure;
    removing the secondary structure; and
    capturing a representation of a surface of the 3D object where the secondary structure was removed, wherein the 3D object is authenticated based on the representation of the surface.

2. The method of claim 1, wherein the secondary structure further comprises a sprue.

3. The method of claim 1, wherein the secondary structure further comprises a printed label tag.

4. The method of claim 1, wherein the representation comprises a two-dimensional image.

5. The method of claim 1, wherein the representation comprises a measurement of geometrical features of the surface.

6. The method of claim 1, wherein the surface comprises a plurality of different colors to provide a unique pattern of colors on the surface.

7. An apparatus, comprising:
    an optical device to capture a representation of a surface of a three-dimensional (3D) printed object, wherein the surface is created by removal of a secondary structure from the surface of the 3D printed object;
    a memory to store previously captured representations of different surfaces of different 3D printed objects; and
    a processor communicatively coupled to the optical device and the memory, wherein the processor is to control the optical device to capture the representation and to authenticate the 3D printed object based on a comparison of the representation to the plurality of previously captured representations stored in memory.

8. The apparatus of claim 7, wherein the optical device comprises a camera to capture the representation, the representation being a two-dimensional photograph of the surface.

9. The apparatus of claim 7, wherein the optical device comprises a three-dimensional scanner to measure geometric features of the surface.

* * * * *